United States Patent
Arai et al.

(10) Patent No.: US 9,518,590 B2
(45) Date of Patent: Dec. 13, 2016

(54) MOTOR-DRIVEN COMPRESSOR INCLUDING A PROTECTING COVER

(71) Applicant: KABUSHIKI KAISHA TOYOTA JIDOSHOKKI, Kariya-shi, Aichi-ken (JP)

(72) Inventors: Tomoharu Arai, Kariya (JP); Tatsuya Ito, Kariya (JP); Ken Suitou, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 490 days.

(21) Appl. No.: 13/930,993

(22) Filed: Jun. 28, 2013

(65) Prior Publication Data
US 2014/0003973 A1    Jan. 2, 2014

(30) Foreign Application Priority Data

Jun. 29, 2012 (JP) ................. 2012-146609

(51) Int. Cl.
*F04D 29/40*    (2006.01)
*F04D 29/42*    (2006.01)
(Continued)

(52) U.S. Cl.
CPC ....... *F04D 29/4206* (2013.01); *B60H 1/00521* (2013.01); *B60H 1/3229* (2013.01);
(Continued)

(58) Field of Classification Search
CPC ... B60H 1/00521; B60H 1/3229; B60R 19/02; B60R 19/14; B60R 19/16; B60R 2019/1813; B60R 2019/026; B62D 25/16; B62D 25/18; F04B 39/127; F04D 29/60; F04D 29/601
(Continued)

(56) References Cited

U.S. PATENT DOCUMENTS 1,294,283 A * 2/1919 Linhart ................. B62D 25/18
                                                280/847
D282,535 S * 2/1986 Whittington ................. D12/181
(Continued)

FOREIGN PATENT DOCUMENTS

CN    1526941 A    9/2004
CN    1854520 A    11/2006
(Continued)

OTHER PUBLICATIONS

Communication dated Jul. 24, 2014 from The Korean Intellectual Property Office in counterpart Korean Patent Application No. 10-2013-0075157.
(Continued)

*Primary Examiner* — William H Rodriguez
*Assistant Examiner* — Charles Nichols
(74) *Attorney, Agent, or Firm* — Sughrue Mion, PLLC

(57) ABSTRACT

It is an object of the invention to provide a motor-driven compressor being fixable reliably to a vehicle or the like and being capable of reliably protecting elements accommodated in a housing even upon reception of an external force due to a collision by any possibility.

A motor-driven compressor of the invention comprises a compression mechanism for compressing fluid, an electric motor for driving the compression mechanism, a motor drive circuit for driving the electric motor, and a housing. The housing accommodates the compression mechanism, the electric motor, and the motor drive circuit. A cover for protecting the housing from an external force caused by a collision is fixed to the outside of the housing. The cover is arranged via a clearance with respect to the housing, and absorbs the external force applied to the cover by the clearance.

9 Claims, 9 Drawing Sheets

(51) Int. Cl.
  *F04D 29/60* (2006.01)
  *B60H 1/00* (2006.01)
  *B60H 1/32* (2006.01)
  *F04B 39/12* (2006.01)

(52) U.S. Cl.
  CPC .......... *F04B 39/121* (2013.01); *F04D 29/601* (2013.01); *Y10S 903/902* (2013.01)

(58) Field of Classification Search
  USPC ............... 417/423.14, 360, 363; 74/608, 612
  See application file for complete search history.

(56) References Cited

U.S. PATENT DOCUMENTS

| | | | | |
|---|---|---|---|---|
| 4,993,682 | A | * | 2/1991 | Imai .................. F16F 15/08 248/635 |
| 6,352,247 | B1 | * | 3/2002 | Ishikawa ............... F01C 21/007 248/638 |
| 2010/0226800 | A1 | | 9/2010 | Ichise et al. |
| 2011/0133575 | A1 | * | 6/2011 | Arashi ................. B60H 1/3229 307/326 |
| 2011/0243771 | A1 | | 10/2011 | Kinoshita et al. |

FOREIGN PATENT DOCUMENTS

| | | |
|---|---|---|
| CN | 101463814 A | 6/2009 |
| EP | 1447553 A2 | 8/2004 |
| EP | 1 715 185 A1 | 10/2006 |
| EP | 2 196 672 A1 | 6/2010 |
| JP | 299274 U | 8/1990 |
| JP | 988824 A | 3/1997 |
| JP | 2009-085082 A | 4/2009 |
| JP | 2009-103100 A | 5/2009 |
| JP | 2009-243347 A | 10/2009 |
| JP | 2011-208619 A | 10/2011 |
| JP | 4821453 B2 | 11/2011 |
| KR | 10-2004-0073982 A | 8/2004 |

OTHER PUBLICATIONS

Communication dated Oct. 13, 2014 from the Korean Intellectual Property Office in counterpart application No. 10-2013-0075157.
Communication dated Jun. 24, 2014, issued by the Japan Patent Office in corresponding application No. 2012-146609.
Communication dated May 6, 2015 from the State Intellectual Property Office of the P.R.C. in counterpart application No. 201310265549.9.
Extended European Search Report dated Oct. 4, 2013, issued in corresponding European Patent Application 13174294.2.

* cited by examiner

MOTOR-DRIVEN COMPRESSOR INCLUDING A PROTECTING COVER

TECHNICAL FIELD

The present invention relates to a motor-driven compressor including a compression mechanism for compressing fluid and an electric motor for driving the compression mechanism.

BACKGROUND ART

Generally, a motor-driven compressor is mounted on hybrid automotive vehicles and electric automobiles as part of an air-conditioning apparatus. The motor-driven compressor includes a compression mechanism for compressing fluid and an electric motor for driving the compression mechanism integrated to each other.

For example, a hybrid automotive vehicle employs an internal combustion engine and an electric motor as traveling drive sources, and the internal combustion engine and the electric motor are arranged in an engine room. The hybrid automotive vehicle may employ a layout structure in which the motor-driven compressor is directly fixed to the internal combustion engine. In such a case, the motor-driven compressor is arranged at a position close to a frame or aside member which constitutes part of a body in the engine room.

In contrast, an electric automobile employs a traveling electric motor as the traveling drive source, and the traveling electric motor is arranged in a motor room. The electric automobile may employ a layout structure in which the motor-driven compressor is fixed to a front portion or a side portion of the traveling electric motor. The motor-driven compressor may be arranged on the frame or the side member in the motor room.

Patent publication 1 discloses a motor-driven compressor for a vehicle. In this motor-driven compressor, a compression mechanism and an electric motor are accommodated in a housing. Also, a motor drive circuit for controlling a rotation of the electric motor is disposed out of the housing. A cover for protecting the motor drive circuit from an external force is provided on the outside of the motor drive circuit of the motor-driven compressor. The motor-driven compressor is not susceptible to damage which may impair functions thereof on the motor drive circuit or a high-voltage cable or the like even though the cover is subjected to an external force by a collision by any possibility.

In the same motor-driven compressor, the housing includes a leg portion to be fixed to the vehicle, and a boss portion at a distal end side of the leg portion is provided with a stress concentration portion. Therefore, when the motor-driven compressor is subjected to an external force, the boss portion is ruptured before a root side of the leg portion, so that the leg portion moves integrally with the motor-driven compressor and the motor drive circuit. Accordingly, for example, the leg portion ruptured from the root is prevented from interfering with the motor drive circuit.

CITATION LIST

Patent Publication

{Patent Publication 1} JP-A-2009-85082

SUMMARY OF INVENTION

Technical Problem

However, in the motor-driven compressor disclosed in patent publication 1 described above, the cover has no more than a function to protect the motor drive circuit. Therefore, when an external force as great as being impossible to protect by the cover is applied on the motor-driven compressor in case of a collision by any possibility, the probability of occurrence of damage on the motor drive circuit together with the damage of the cover is high in the case of the motor-driven compressor fixed to the engine of the vehicle.

The motor-driven compressor of this configuration is provided with the stress concentration portion on the boss portion on the distal end side of the leg portion so as to cause the boss portion to be ruptured before the root side of the leg portion upon reception of an external force. However, the stress concentration portion has a structure which positively lowers the strength of the leg portion, and hence conflicts an idea of reliably fixing the motor-driven compressor to the vehicle or the like.

The present invention is created in view of such problems described above. It is an object of the invention to provide a motor-driven compressor being fixable reliably to a vehicle or the like and being capable of reliably protecting elements accommodated in a housing even upon reception of an external force due to a collision by any possibility.

Solution to Problem

In order to solve the above-described problem, a motor-driven compressor according to the present invention comprises:
a compression mechanism for compressing fluid;
an electric motor for driving the compression mechanism;
a motor drive circuit for driving the electric motor; and
a housing for accommodating the compression mechanism, the electric motor, and the motor drive circuit, wherein
a cover for protecting the housing from an external force caused by a collision is fixed to the outside of the housing, and
the cover is arranged via a clearance with respect to the housing, and the external force applied to the cover is absorbed by the clearance.

Other aspects and advantages of the invention will become apparent from the following description, taken in conjunction with the accompanying drawings, illustrating by way of example the principles of the invention.

DESCRIPTION OF EMBODIMENTS

First Embodiment

Figure 1:
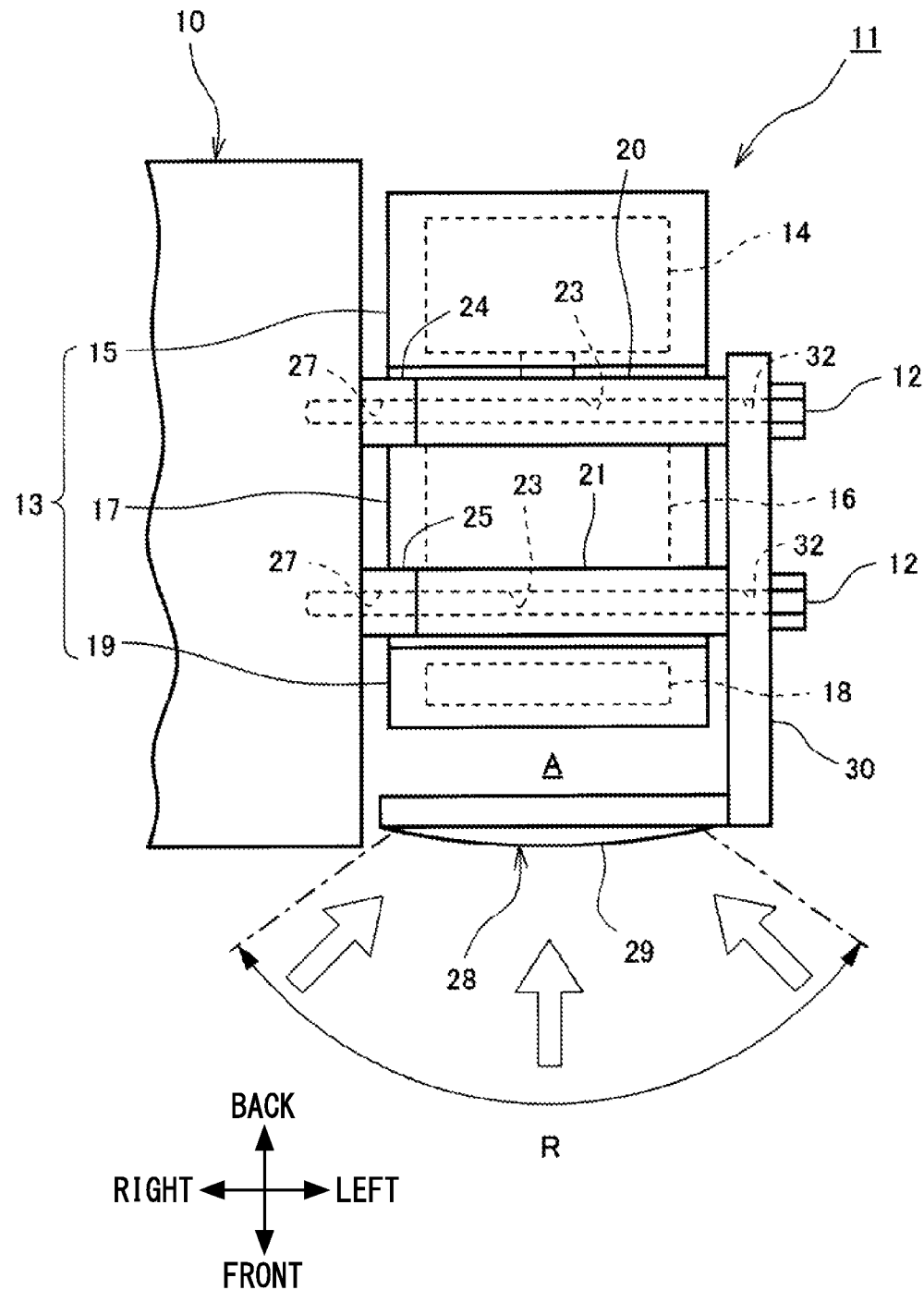
FIG. 1 is a schematic plan view of a motor-driven compressor according to a first embodiment.

Referring now to the drawings, a motor-driven compressor according to a first embodiment will be descried below. In this embodiment, a motor-driven compressor mounted on a hybrid automotive vehicle will be described as an example. The motor-driven compressor is an element which constitutes part of a refrigeration circuit of an air-conditioning apparatus for a vehicle.

As illustrated in FIG. 1, an engine 10 for traveling is installed in an engine room of a hybrid automotive vehicle (hereinafter, referred to as "vehicle"). In FIG. 1, a lower side corresponds to a front side of the vehicle, an upper side corresponds to a back side of the same, and a left and right direction corresponds to a direction of width of the same. Other drawings are in accord with FIG. 1.

In the engine room, a motor for traveling, a power generator, a power control unit (PCU) and the like, not illustrated are installed in addition to the engine 10. The engine room is a space defined by being partitioned by a frame (not illustrated) which constitutes the vehicle and a side member (not illustrated) as part of a body.

In this embodiment, a motor-driven compressor 11 is fixed by a plurality of fastening bolts 12 to a left side surface of the engine 10. The respective fastening bolts 12 correspond to a fastening device of the invention. The motor-driven compressor 11 includes a cylindrical housing 13 formed of aluminum-based metallic material. The housing 13 includes a first housing portion 15 accommodating a compression mechanism 14, a motor housing portion 17 accommodating an electric motor 16, and a second housing portion 19 accommodating a motor drive circuit 18.

Figure 2:
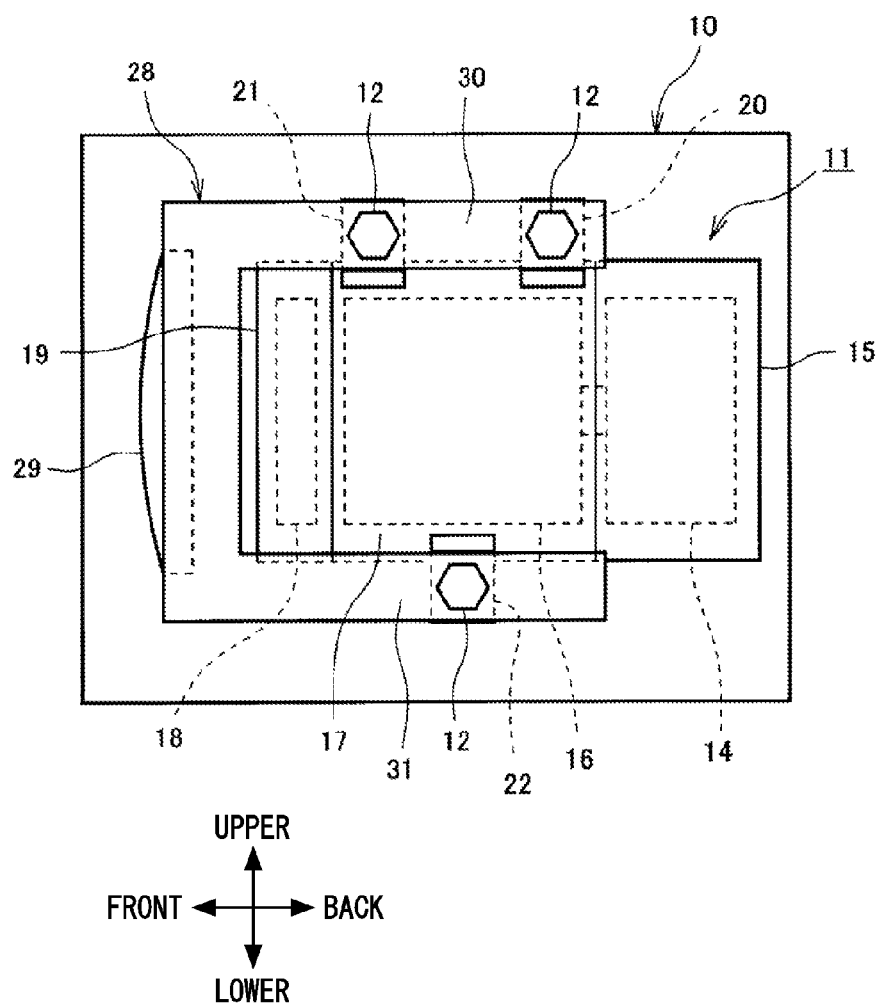
FIG. 2 is a schematic side view of the motor-driven compressor according to the first embodiment.

As illustrated in FIG. 1 and FIG. 2, a front end of the first housing portion 15 and a back end of the motor housing portion 17 are joined. A front end of the motor housing portion 17 and a back end of the second housing portion 19 are also joined.

The motor housing portion 17 is provided with three leg portions 20, 21, 22 for fixing the motor-driven compressor 11 to the engine 10 as an object for fixation on an outer peripheral surface of the motor housing portion 17. The leg portions 20 to 22 are formed with respective insertion holes 23 for allowing insertion of the respective fastening bolts 12.

Figure 3:
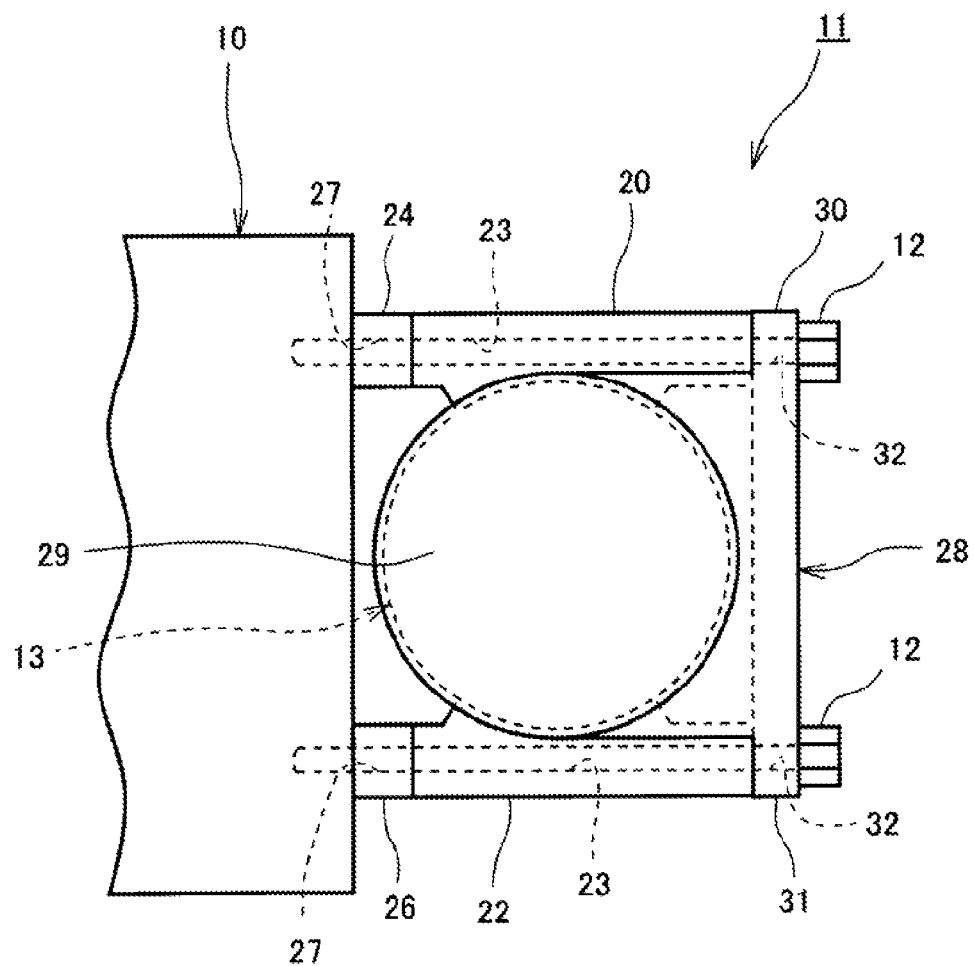
FIG. 3 is a schematic front view of the motor-driven compressor according to the first embodiment.
Figure 3:
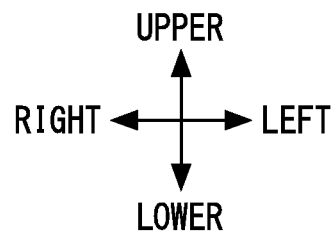
Figure 4:
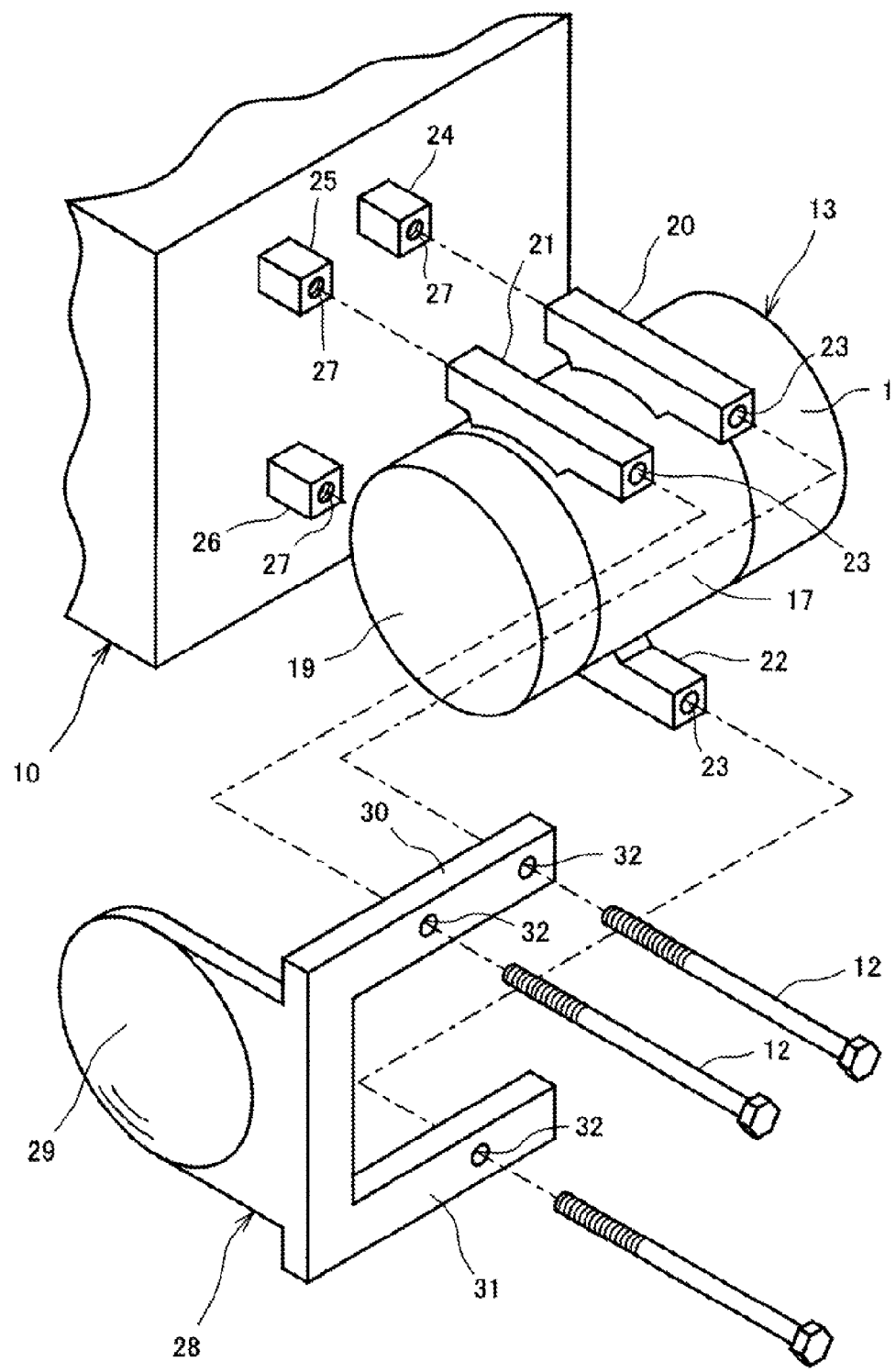
FIG. 4 is an exploded perspective view of the motor-driven compressor according to the first embodiment.

As illustrated in FIG. 1, FIG. 3, and FIG. 4, a base portion 24 coming into abutment with a right end of the leg portion 20, a base portion 25 coming into abutment with a right end of the leg portion 21, and a base portion 26 coming into abutment with a right end of the leg portion 22 are formed on a left side surface of the engine 10 respectively. The base portions 24 to 26 are formed with screw holes 27 which allow the respective fastening bolts 12 to be screwed in.

In a state in which the motor-driven compressor 11 is fixed to the engine 10, the motor-driven compressor 11 is placed transversely mounted. The two leg portions 20, 21 are positioned on the upper side of the motor housing portion 17, and one leg portion 22 is positioned on the lower side of the motor housing portion 17. The direction of insertion of the respective insertion holes 23 of the leg portions 20 to 22 is aligned with the direction of width of the vehicle. Also, in a state in which the motor-driven compressor 11 is fixed to the engine 10, the second housing portion 19 is positioned at the front, the first housing portion 15 is positioned at the back, and the motor housing portion 17 is positioned between the second housing portion 19 and the first housing portion 15.

The compression mechanism 14 accommodated in the first housing portion 15 is a scroll type provided with a fixed scroll (not illustrated) and a movable scroll (not illustrated). The compression mechanism 14 is formed with operation chambers by the fixed scroll and the movable scroll. A capacity of the operation chambers varies with the movable scroll pivoting with respect to the fixed scroll. Therefore, the operation chambers intake refrigerant as fluid, compress the refrigerant, and discharge the refrigerant at a high pressure. The compression mechanism 14 fulfills these functions.

The electric motor 16 accommodated in the motor housing portion 17 is driven by a three-phase AC power. The electric motor 16 drives the compression mechanism 14 by pivoting the movable scroll of the compression mechanism 14. The electric motor 16 includes a rotor (not illustrated) provided with a rotary shaft (not illustrated) and a stator (not illustrated) covering a periphery of the rotor. The rotary shaft is coupled to the movable scroll. The stator includes a stator coil. The stator is fixed to an inner wall of the motor housing portion 17. The stator coil has a portion where a high-voltage power is applied.

The motor drive circuit 18 accommodated in the second housing portion 19 performs rotation control of the electric motor 16, and power supply to the electric motor 16. The motor drive circuit 18 is composed of electric components such as a switching element for converting DC power from a battery (not illustrated) to AC power. The motor drive circuit 18 and the electric motor 16 are connected by a cluster block (not illustrated) and a hermetic terminal (not illustrated). The motor drive circuit 18 has a power supply cable (not illustrated) for receiving power supply from the battery. The motor drive circuit 18, the cluster block, the hermetic terminal, and the power supply cable are portions to which a high-voltage power is applied.

In this embodiment, the motor-driven compressor 11 includes an iron-made cover 28 configured to protect the motor drive circuit 18 from an external force. The cover 28 includes a protecting portion 29 opposing a front end surface of the second housing portion 19, and mounting portions 30, 31 coupled integrally with the protecting portion 29 and fixed to the leg portions 20 to 22 by the fastening bolts 12.

A front surface of the protecting portion 29 is a projecting curved surface. A back surface of the protecting portion 29 is a flat surface. A clearance A is secured between the protecting portion 29 and the second housing portion 19. The clearance A is secured for preventing the cover 28 and the second housing portion 19 from directly interfering with each other even though the cover 28 is subjected to an external force. Therefore, the distance of the clearance A is preferably set to be at the largest possible distance within a range allowable in terms of space limitation in the engine room.

The mounting portions 30, 31 are two plate-shaped portions extending from the second housing portion 19 toward the first housing portion 15 respectively along an outer peripheral surface of the housing 13. The mounting portions 30, 31 extend at a right angle with respect to a back surface of the protecting portion 29. The mounting portion 30 is formed with respective through holes 32 at positions corresponding to the respective insertion holes 23 of the leg portions 20, 21 of the housing 13. The mounting portion 31 is formed with the through holes 32 at positions corresponding to the insertion holes 23 of the leg portion 22 of the housing 13. The fastening bolts 12 are inserted through the respective through holes 32, and are tightened by the screw holes 27 of the base portions 24 to 26. The mounting portions 30, 31 are fixed between the leg portions 20 to 22 and head portions of the fastening bolts 12. In other words, the cover 28 is fixed to the outside of the housing 13 and is arranged with the clearance A with respect to the housing 13.

In a state in which the motor-driven compressor 11 is fixed to the engine 10, the longitudinal direction of the mounting portions 30, 31 is aligned with the front-back direction of the vehicle. Therefore, when the protecting portion 29 is subjected to an external force including a component in the front-back direction, the component in the front-back direction of the external force is transmitted to the fastening bolts 12 via the mounting portions 30, 31.

Subsequently, a procedure of fixing the motor-driven compressor 11 to the engine 10 will be described. As illustrated in FIG. 4, right end surfaces of the leg portions 20 to 22 are brought into abutment with the base portions 24 to 26 of the engine 10, and the respective screw holes 27 of the base portions 24 to 26 and the insertion holes 23 of the leg portions 20 to 22 are aligned. When the mounting portions 30, 31 of the cover 28 are brought into abutment with left end surfaces of the leg portions 20 to 22 and the insertion holes 23 of the leg portions 20 to 22 and the through holes 32 of the mounting portions 30, 31 are aligned. Subsequently, the respective fastening bolts 12 are inserted through the respective through holes 32 and the respective insertion holes 23, and are screwed into the screw holes 27 of the base portions 24 to 26. Accordingly, the cover 28 is held by the leg portions 20 to 22 and the fastening bolts 12. Then, the motor-driven compressor 11 is fixed to the engine 10.

The motor-driven compressor 11 is connected to piping of the refrigeration circuit, and the power supply cable of the motor-driven compressor 11 is connected to a cable on a power supply side such as a battery. In a state in which the motor-driven compressor 11 is fixed to the engine 10, the mounting portions 30, 31 of the cover 28 are located between the head portions of the fastening bolts 12 and the leg portions 20 to 22 in a position of being apart most from the engine 10 in the direction of width of the vehicle.

Subsequently, the operation of the motor-driven compressor 11 will be described. When DC power is supplied from the battery to the motor drive circuit 18, supply of three-phase AC power to the electric motor 16 is enabled. Accordingly, the electric motor 16 is brought into a state of being available for driving. When the electric motor 16 is driven by control of the motor drive circuit 18, the movable scroll pivots with respect to the fixed scroll, and the compression mechanism 14 is driven. The refrigerant in the refrigeration circuit is sucked into the operation chambers of the compression mechanism 14 by the driving of the compression mechanism 14. The refrigerant sucked into the operation chambers is compressed by the compression mechanism 14, and compressed high-pressure refrigerant is discharged to the refrigeration circuit. Therefore, in the refrigeration circuit, the refrigerant at a high-temperature and a high-pressure is supplied to an evaporator via a condenser and an expansion valve.

Incidentally, if the vehicle collides with another vehicle or an aboveground structure from the front or from obliquely front by any possibility, the frame and the side member or the like which constitute the engine room may be deformed and hence the motor-driven compressor 11 is in danger of being subjected to some external force. Hollow arrows in FIG. 1 indicate the external force.

The motor-driven compressor 11 in this embodiment is in a state in which the protecting portion 29 of the cover 28 is subjected to an external force from a direction of a specific range R about the front. The specific range R is a range in the direction of input of the external force which may be applied with high likelihood to the motor drive circuit 18 when the cover 28 is not provided. When the magnitude of the external force is a force to an extent which does not cause damage of the cover 28, the cover 28 is capable of being subjected to the external force and protecting the motor drive circuit 18.

When an external force having a magnitude which may cause damage on the cover 28 is input, even when the protecting portion 29 is deformed, the clearance A formed between the second housing portion 19 and the protecting portion 29 absorbs the external force applied to the cover 28. Therefore, the motor drive circuit 18 is not immediately subjected to the external force. When the cover 28 is subjected to an external force by a collision, the load caused by the external force is transmitted to the fastening bolts 12 and the leg portions 20 to 22 first via the cover 28. Therefore, the motor drive circuit 18 is not immediately subjected to the external force.

The component in the front-back direction of the external force input to the cover 28 is a right direction with respect to the direction of axes of the respective fastening bolts 12. The mounting portions 30, 31 of the cover 28 are present between the head portions of the fastening bolts 12 and the leg portions 20 to 22 in a position of being apart most from the engine 10 in the direction of width of the vehicle. Therefore, excessive moment may be generated in the respective fastening bolts 12 which are subjected to a load.

Figure 5:
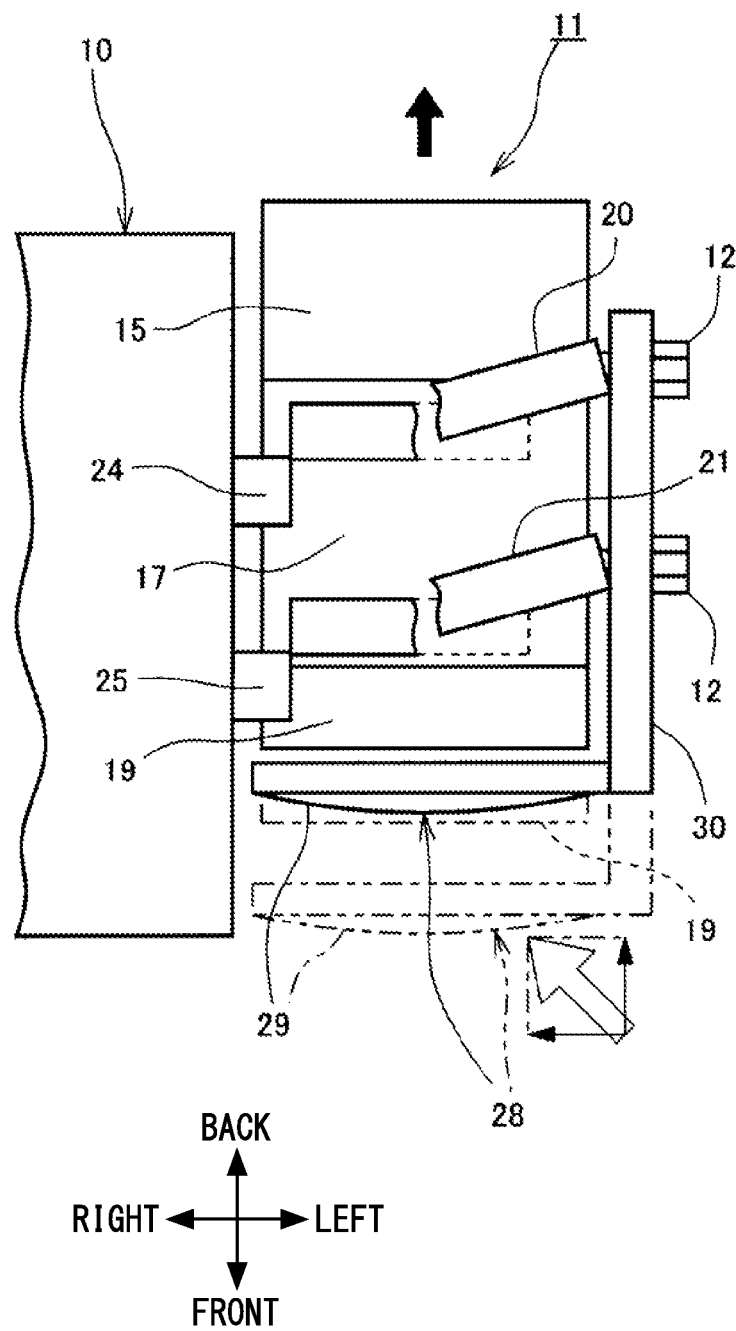
FIG. 5 is a schematic plan view illustrating an example of the motor-driven compressor according to the first embodiment in a state after a collision.

When excessive moment is generated in the respective fastening bolts 12, at least one of the leg portions 20 to 22 and the fastening bolts 12 are damaged. For example, as illustrated in FIG. 5, the motor-driven compressor 11 is separated from the engine 10 due to the damage of the leg portions 20 to 22 or the fastening bolts 12 and moved backward. Even when the motor-driven compressor 11 moved backward collides with the frame or the like, and assuming that the first housing portion 15 is damaged, only leakage of the refrigerant may result. In the engine room, the motor-driven compressor 11 is moved away from the input side of the external force, and hence the motor drive circuit 18 is not directly subjected to the external force. Since the clearance A is formed between the second housing portion 19 and the protecting portion 29, even when the protecting portion 29 is moved toward the motor drive circuit 18, the motor drive circuit 18 is not immediately subjected to the external force. In addition, the cover 28 is deformed or moves away from the housing 13, so that energy on the basis of the external force is reduced by the deformation or separation of the cover 28 even when the cover 28 interferes with the motor drive circuit 18. Therefore, the probability of damage of the motor drive circuit 18 is low.

The motor-driven compressor 11 according to this embodiment provides the following advantages and effects.

(1) Even though the cover 28 is subjected to an external force due to a collision by any possibility, the clearance A defined between the cover 28 and the second housing portion absorbs the external force applied to the cover 28. Therefore, the housing 13 is not immediately subjected to the external force. Accordingly, the motor drive circuit 18, which is an element accommodated in the second housing portion 19 of the housing 13 and is subjected to a high-voltage power, is reliably protected. When the cover 28 is subjected to an external force, the load caused by the external force is transmitted to the fastening bolts 12 and the leg portions 20 to 22 via the cover 28. When the load transmitted to the fastening bolts 12 and the leg portions 20 to 22 has a magnitude that ruptures at least one of the fastening bolts 12 and the leg portions 20 to 22, the motor-driven compressor 11 is separated from the engine 10. The motor-driven compressor 11 moves away from the input side of the external force integrally with the cover 28. Therefore, the motor drive circuit 18 is reliably protected.

(2) The mounting portions 30, 31 of the cover 28 exist at positions most apart from the engine 10 in which the fastening bolts 12 are screwed, and are positioned between the head portions of the fastening bolts 12 and the leg portions 20 to 22. Therefore, excessive moment may be generated in the fastening bolts 12 which are subjected to the load. As a consequence, when excessive moment is generated in the fastening bolts 12, at least one of the leg portions 20 to 22 and the fastening bolts 12 are damaged.

(3) When the cover 28 is subjected to an external force having a magnitude that causes damage thereto, the motor-driven compressor 11 is separated from the engine 10 and moves to a direction away from the input side of the external force. Therefore, the motor drive circuit 18 is prevented from being damaged. As a consequence, the motor-driven compressor of this type does not need to employ the structure to make the leg portions of the housing or the fastening bolts fragile as that of the background art. Also, the motor-driven compressor of this type allows the motor-driven compressor 11 to be reliably fixed to the engine 10 without lowering the strength of the leg portions 20 to 22. In addition, the motor-driven compressor 11 has no risk of coming apart from the engine 10 during a normal operation. The motor-driven compressor 11 may have a configuration in which the existing leg portions 20 to 22 and the fastening bolts 12 are used and the cover 28 is added.

(4) The cover 28 fulfills the function to protect the motor drive circuit 18 and the function to transmit the component of the external force in the front-back direction to the fastening bolts 12 and the leg portions 20 to 22 as a load. Therefore, the cover 28 is capable of not only protecting simply the motor drive circuit 18, but also transmitting the load for causing the motor-driven compressor 11 to be separated from the engine 10.

(5) Since the cover 28 is fixed to the leg portions 20 to 22 by the fastening bolts 12, there is no need to provide another device for fixing the cover 28. Therefore, increase in number of components may be prevented. Fixation of the cover 28 to the leg portions 20 to 22 and fixation of the motor-driven compressor 11 to the engine 10 are achieved simultaneously with the fastening bolts 12. Therefore, the fixing operation may be simplified.

Second Embodiment

Referring to the drawings, a motor-driven compressor according to a second embodiment will be descried. The motor-driven compressor of this embodiment is different from the motor-driven compressor of the first embodiment in a structure of the cover and a position to fix the cover. In this embodiment, as regards the same configuration as the first embodiment, the description of the first embodiment is incorporated and the common reference numerals are used.

Figure 6:
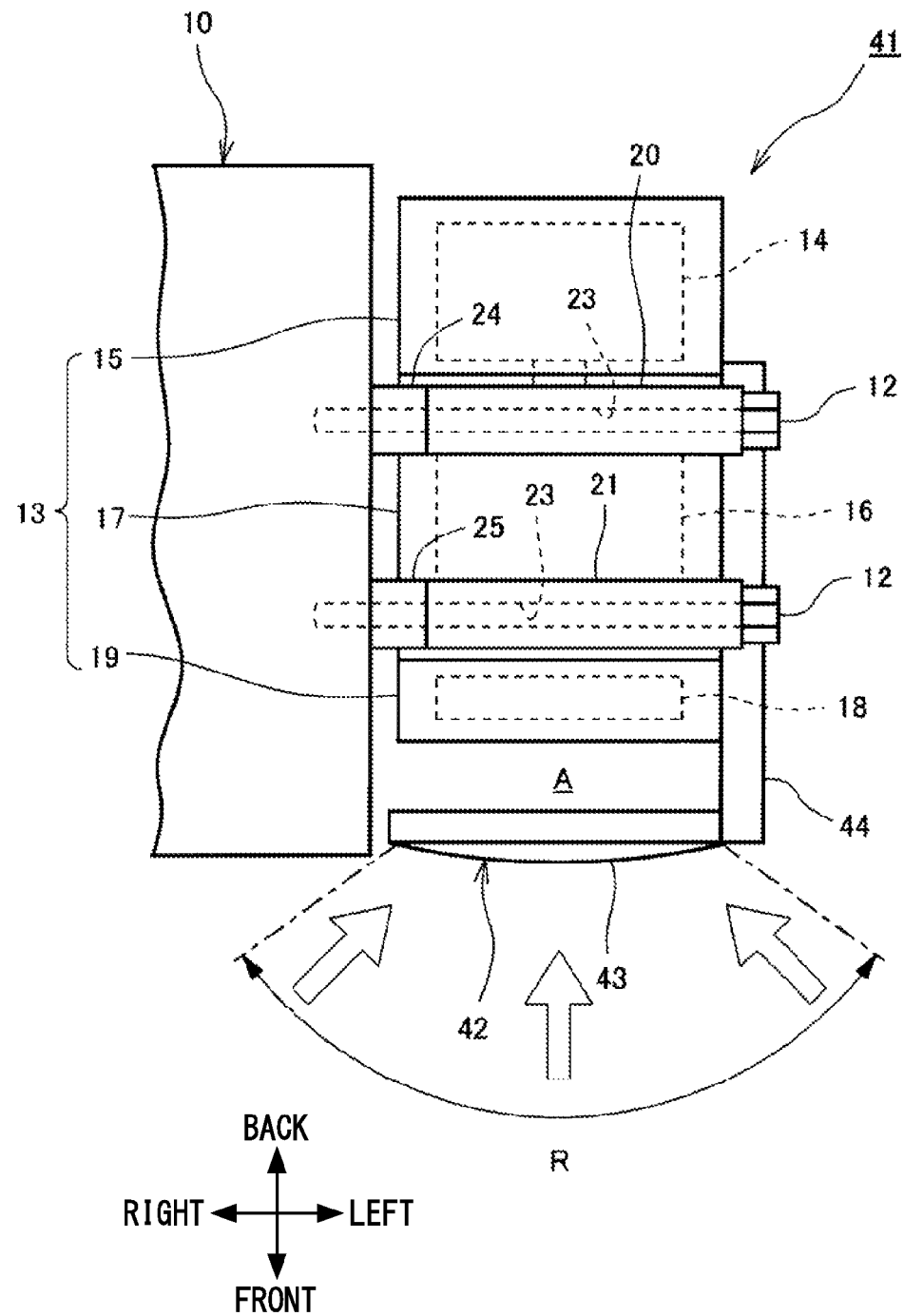
FIG. 6 is a schematic plan view of a motor-driven compressor according to a second embodiment.
Figure 7:
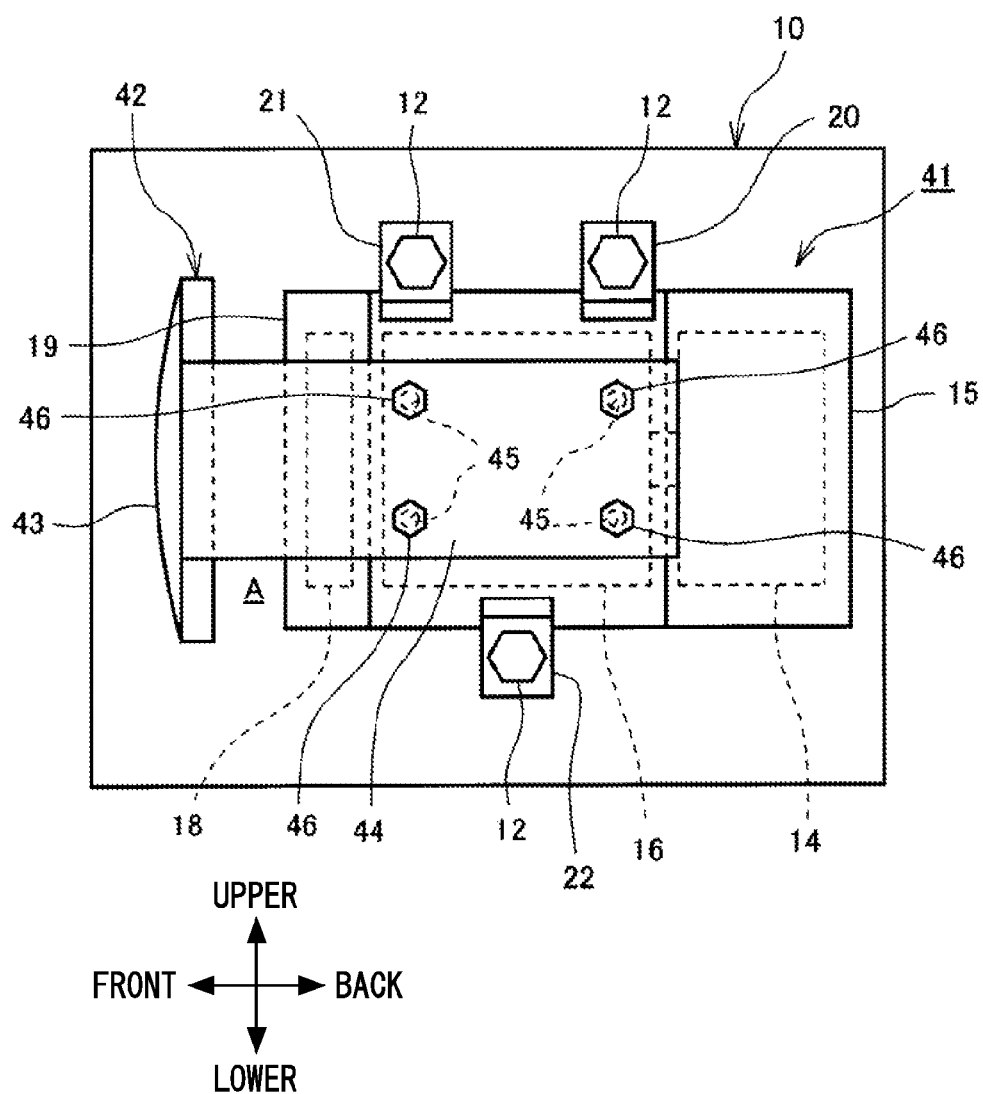
FIG. 7 is a schematic side view of the motor-driven compressor according to the second embodiment.

As illustrated in FIG. 6 and FIG. 7, in a motor-driven compressor 41, a cover 42 is not fixed to the leg portions 20 to 22 and is fixed to the housing 13. The fastening bolts 12 pass through the insertion holes 23 of the leg portions 20 to 22 provided on the motor housing portion 17, and are screwed into the respective screw holes 27 of the base portions 24 to 26 of the engine 10. Accordingly, the motor-driven compressor 41 is fixed to the engine 10.

The cover 42 is provided with a protecting portion 43 and a mounting portion 44. The protecting portion 43 basically has the same configuration as the protecting portion 29 of the cover 28 of the first embodiment. The clearance A is defined between the protecting portion 43 and the second housing portion 19. The mounting portion 44 is a single plate-shaped portion extending from the second housing portion 19 toward the first housing portion 15 along the outer peripheral surface of the housing 13. The mounting portion 44 is formed with through holes 45 which allow insertion of fixing bolts 46 as fixing members or fixing to the motor housing portion 17. The motor housing portion 17 is formed with a plurality of screw holes (not illustrated) which allow the fixing bolts 46 to be screwed in. The size or the number of the fixing bolts 46 may be determined considering the magnitude of an external force that the cover 42 is subjected to. Even though the external force has an enough magnitude to cause the cover 42 to be damaged, the size and the number of the fixing bolts 46 to an extent which does not cause the cover 42 to be separated from the motor housing portion 17 may be selected.

In this embodiment, the fixing bolts 46 are inserted respectively to the respective through holes 45 of the mounting portion 44. The cover 42 is fixed to the motor housing portion 17 by screwing the fixing bolts 46 into the screw holes of the motor housing portion 17. In a state in which the motor-driven compressor 41 is fixed to the engine 10, the longitudinal direction of the mounting portion 44 is aligned with the front-back direction of the vehicle. Therefore, when the protecting portion 43 is subjected to an external force including a component in the front-back direction, the component of the external force in the front-back direction is transmitted to the motor housing portion 17 via the mounting portion 44.

The motor-driven compressor 41 in this embodiment has a structure in which the cover 42 is subjected to an external force from a direction of the specific range R about the front. When the magnitude of the external force is a force to an extent which does not cause damage of the cover 42, the cover 42 is capable of being subjected to the external force and protecting the motor drive circuit 18.

When an external force having a magnitude which may cause damage on the cover 42 is input, even when the protecting portion 43 is deformed, the clearance A formed between the second housing portion 19 and the protecting portion 43 absorbs the external force applied to the cover 42. Therefore, the motor drive circuit 18 is not immediately subjected to the external force. When the cover 42 is subjected to an external force by a collision, the load caused by the external force is transmitted to the fastening bolts 12 and the leg portions 20 to 22 first via the cover 42 and the motor housing portion 17. Therefore, the motor drive circuit 18 is not immediately subjected to the external force. The component in the front-back direction of the external force input to the cover 42 is a right direction with respect to the direction of axes of the fastening bolts 12, and hence excessive moment may be generated in the fastening bolts 12.

When excessive moment is generated in the fastening bolts 12, at least one of the leg portions 20 to 22 and the fastening bolts 12 are damaged. The motor-driven compressor 41 is separated from the engine 10 due to the damage of the leg portions 20 to 22 or the fastening bolts 12 and moved backward. Therefore, the motor drive circuit 18 of the motor-driven compressor 41 is not immediately subjected to the external force.

According to this embodiment, even though the cover 42 is subjected to an external force due to a collision by any possibility, the clearance A defined between the cover 42 and the second housing portion 19 absorbs the external force applied to the cover 42. Therefore, the housing 13 is not immediately subjected to the external force. Accordingly, the motor drive circuit 18, which is an element accommodated in the second housing portion 19 of the housing 13 and is subjected to a high-voltage power, is reliably protected.

The load caused by the external force is transmitted to the fastening bolts 12 and the leg portions 20 to 22 first via the cover 42 and the motor housing portion 17. When the transmitted load has a magnitude that ruptures at least one of the fastening bolts 12 and the leg portions 20 to 22, the motor-driven compressor 41 is separated from the engine 10. The motor-driven compressor 41 moves away from the input side of the external force integrally with the cover 42. Therefore, the motor drive circuit 18 is protected.

In addition, excessive moment may be generated in the fastening bolts 12 which is subjected to the load. As a consequence, when excessive moment is generated, at least one of the leg portions 20 to 22 and the fastening bolts 12 are damaged.

Since the cover 42 is fixed by using the fixing bolts 46, the cover 42 may be mounted after having fixed the housing 13 to the engine 10.

Third Embodiment

Referring to the drawings, a motor-driven compressor according to a third embodiment will be descried. This embodiment is an example in which a shock-absorbing material is interposed in a clearance between the protecting portion of the cover and the second housing portion. In this embodiment, as regards the same configuration as the first embodiment, the description of the first embodiment is incorporated and the common reference numerals are used.

Figure 8:
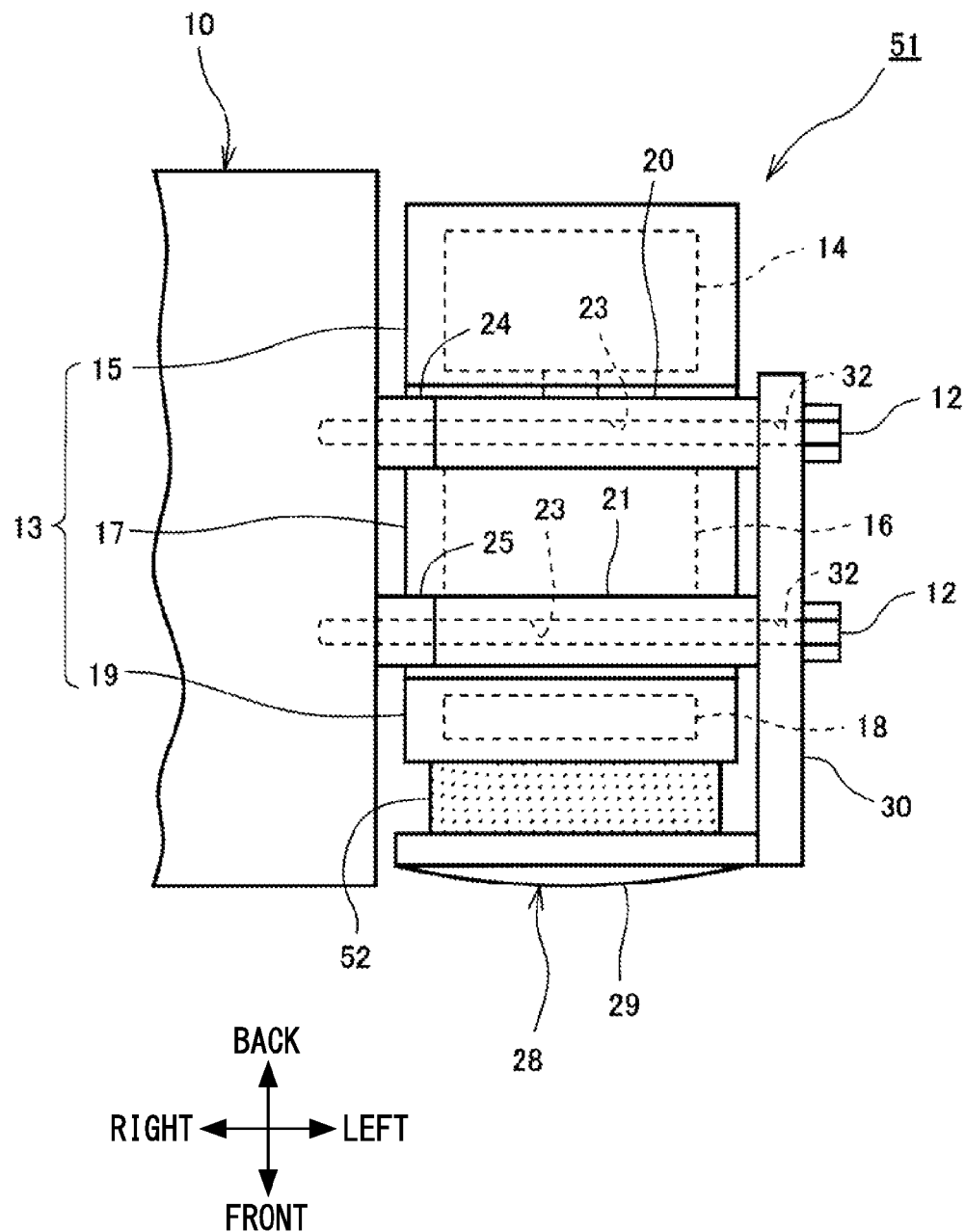
FIG. 8 is a schematic front view of a motor-driven compressor according to a third embodiment.

As illustrated in FIG. 8, in a motor-driven compressor 51, a shock-absorbing material 52 is interposed in a clearance defined between the protecting portion 29 of the cover 28 and the second housing portion 19. The shock-absorbing material 52 is preferably a rubber-based material having resiliency for example, and may be a material that absorbs an impact other than the rubber-based material.

According to this embodiment, even though the cover 28 is subjected to an external force by a collision of the vehicle by any possibility, and is separated from the leg portions 20 to 22, the shock-absorbing material 52 interposed in the clearance between the cover 28 and the second housing portion 19 absorbs an impact, and the housing 13 is not immediately subjected to the external force. Therefore, an impact with respect to the motor drive circuit 18 may be reduced.

Fourth Embodiment

Subsequently, a motor-driven compressor according to a fourth embodiment will be described. In this embodiment, as regards the same configuration as the first embodiment, the description of the first embodiment is incorporated and the common reference numerals are used.

Figure 9A:
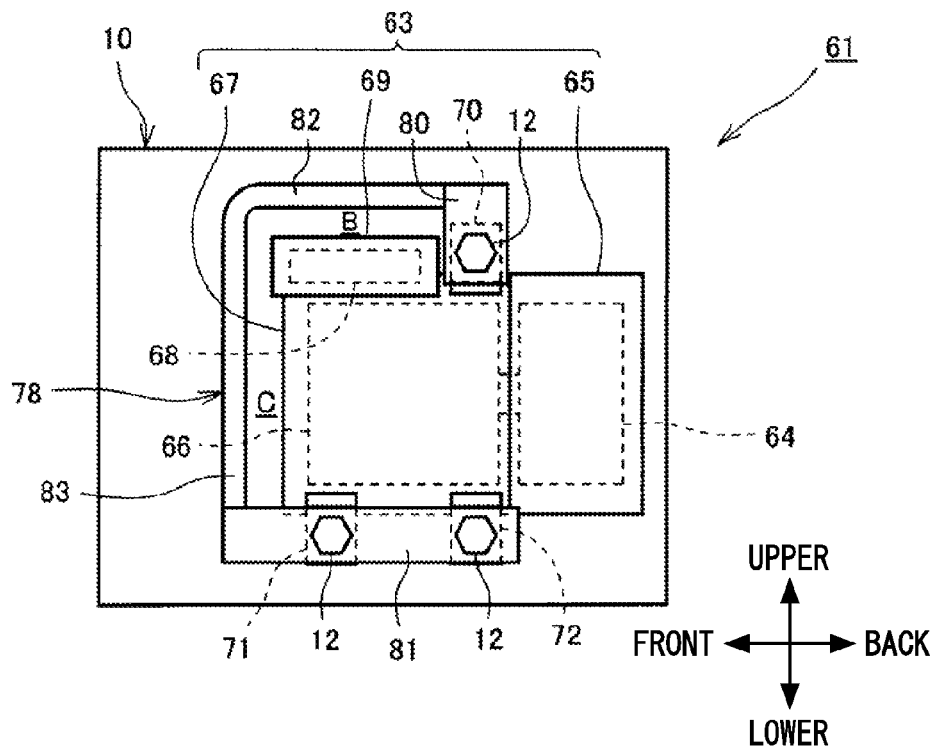
FIG. 9A is a schematic side view of a motor-driven compressor according to a fourth embodiment.
Figure 9B:
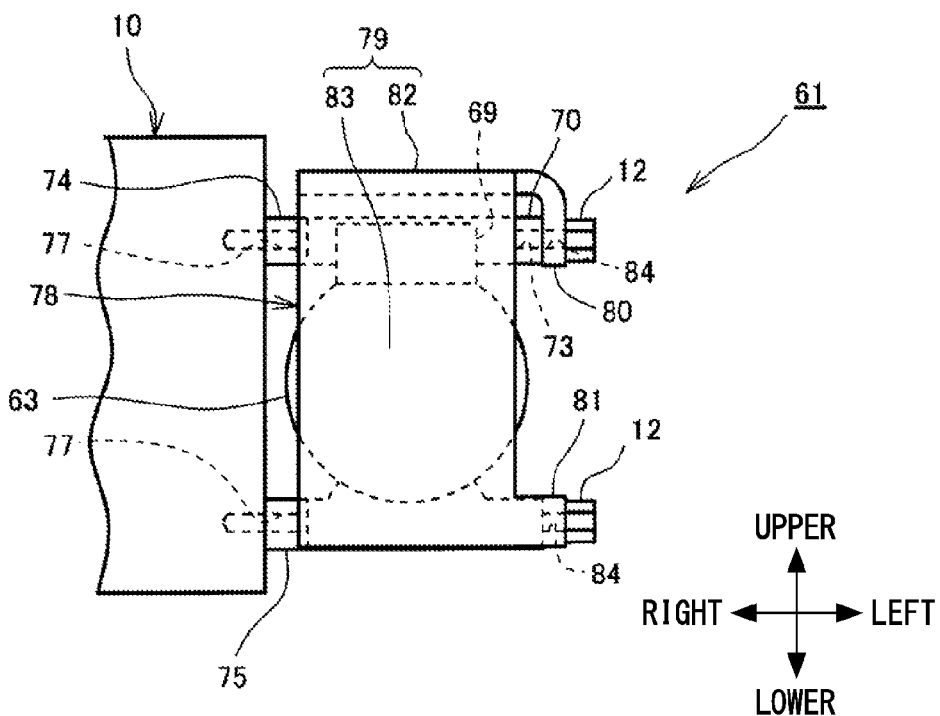
FIG. 9B is a schematic front view of the motor-driven compressor according to the fourth embodiment.

As illustrated in FIG. 9, a housing 63 of a motor-driven compressor 61 includes a cylindrical first housing portion 65 and a motor housing portion 67 joined to a front end of the first housing portion 65. A second housing portion 69 formed integrally with the motor housing portion 67 is formed on an upper side of the motor housing portion 67.

A compression mechanism 64 is accommodated in the first housing portion 65. An electric motor 66 is accommodated in the motor housing portion 67. A motor drive circuit 68 is accommodated in the second housing portion 69

One leg portion 70 is provided on the upper side of the motor housing portion 67 close to the first housing portion 65. Leg portions 71, 72 are provided on a lower side of the motor housing portion 67. The leg portions 70 to 72 are formed with respective insertion holes 73 for allowing insertion of the respective fastening bolts 12.

A base portion 74 capable of coming into abutment with a right end of the leg portion 70, a base portion 75 capable of coming into abutment with a right end of the leg portion 71, and a base portion (not illustrated) capable of coming into abutment with a right end of the leg portion 72 are formed on the engine 10. The base portions 74, 75, and the base portion not illustrated are formed with screw holes 77 which allow the respective fastening bolts 12 to be screwed in.

A cover 78 of this embodiment includes a protecting portion 79 having an inverted L-shape in cross section configured to cover the motor housing portion 67 and the second housing portion 69, an upper mounting portion 80 extending from the protecting portion 79 to the upper leg portion 70, and a lower mounting portion 81 extending from the protecting portion 79 to the leg portions 71, 72 on the lower side.

The protecting portion 79 includes an upper surface plate 82 configured to protect the motor drive circuit 68, and a front surface plate 83 configured to protect the electric motor 66. A clearance B is defined between the upper surface plate 82 and the second housing portion 69. A clearance C is defined between the front surface plate 83 and an end surface of the motor housing portion 67.

The upper surface plate 82 extends horizontally from an upper end of the front surface plate 83 toward the first housing portion 65. The upper mounting portion 80 extends from a side end of the upper surface plate 82 toward the leg portion 70 on the upper side. Respective through holes 84 are formed at positions corresponding to the insertion holes 73 of the leg portions 70 to 72. The lower mounting portion 81 extends from a side end of the front surface plate 83 toward the first housing portion 65. The lower mounting portion 81 is formed with the through holes 84 at positions corresponding to the insertion holes 73 of the leg portions 71, 72. The cover 78 of this embodiment is fixed to the leg portions 70 to 72 by fastening the respective fastening bolts 12.

According to this embodiment, even though the cover 78 is subjected to an external force due to a collision by any possibility, the clearance B between the cover 78 and the second housing portion 69 and the clearance C between the cover 78 and the motor housing portion 67 absorb the external force applied to the cover 78. Therefore, the housing 63 is not immediately subjected to the external force. Accordingly, the motor drive circuit 68 and the electric motor 66, which are elements accommodated in the second housing portion 69 and the motor housing portion 67 of the housing 63 and being subjected to a high voltage power may reliably be protected.

When the load that caused by the external force and transmitted to the fastening bolts 12 and the leg portions 70 to 72 has a magnitude that ruptures at least one of the fastening bolts 12 and the leg portions 70 to 72, the motor-driven compressor 61 is separated from the engine 10. Accordingly, the motor-driven compressor 61 moves away from an input side of the external force integrally with the cover 78. Therefore, the motor drive circuit 68 may be prevented from being damaged.

The embodiments described above are examples of an embodiment of the invention only, and hence the invention is not limited to the embodiments described above and various modifications may be made within the scope of the invention as described below.

Although the motor-driven compressor to be mounted on a hybrid automotive vehicle has been described as an example in the embodiment described above, it may be a motor-driven compressor to be mounted on an electric automobile or an internal combustion engine vehicle.

Although the object for fixation of the motor-driven compressor is the engine of the vehicle in the embodiment described above, the object for fixation is not limited to the engine. The object for fixation of the motor-driven compressor may be the vehicle frame or the side member, or may be a member or an apparatus in the engine room or the motor room such as a motor for traveling or an electric generator. Furthermore, the motor-driven compressor may be provided at any positions such as front, back, left, right, above, and below the vehicle.

Although a scroll type compression mechanism is employed in the motor-driven compressor in the embodiment described above, the invention is not limited thereto. The type of the compression mechanism of the motor-driven compressor is arbitrary, and, for example, the compression mechanisms of a vane type or a reciprocal piston type may be employed.

Although the protecting portion in which the cover faces the entire portion of the end surface of the second housing portion in which the motor drive circuit is accommodated is provided in the embodiment described above, the protecting portion may have a cylindrical shape that covers an outer periphery of the second housing portion. Also, the cover may include the protecting portion facing the second housing portion so as to protect partly instead of entirely the end surface of the second housing portion.

In the respective embodiments except for the second embodiment, the mounting portion of the cover is fixed between the head portions of the bolts and the leg portions. However, the mounting portion is not limited to be fixed between the head portions of the bolts and the leg portions. For example, the mounting portion may be fixed between the base portions of the engine and the leg portions.

In the respective embodiments except for the third embodiment, the clearance is formed between the cover and the second housing. However, the shock-absorbing material may be interposed in the respective clearances as in the third embodiment.

In the respective embodiments except for the fourth embodiment, the motor housing portion and the second housing portion in which the motor driving circuit is accommodated are joined. However, the motor housing portion and the second housing portion may be formed integrally. In this case, the second housing portion may be covered by the lid member.

The cover is not limited to an iron made, but may be FRP or the like, in addition to metals having high rigidity such as iron alloy or stainless.

REFERENCE SIGNS LIST

10 . . . engine (object for fixation)
11, 41, 51, 61 . . . motor-driven compressor
12 . . . fastening bolt (fastening device)
13, 63 . . . housing
14, 64 . . . compression mechanism
15, 65 . . . first housing portion
16, 66 . . . electric motor
17, 67 . . . motor housing portion
18, 68 . . . motor drive circuit
16, 69 . . . second housing portion
20, 21, 22, 70, 71, 72 . . . leg portion
28, 42, 78 . . . cover
29, 43, 79 . . . protecting portion
30, 31, 44 . . . mounting portion
32, 45, 84 . . . through hole
46 . . . fixing bolt
52 . . . shock-absorbing material
80 . . . upper mounting portion
81 . . . lower mounting portion
82 . . . upper surface plate
83 . . . front surface plate
A, B, C . . . clearance
R . . . specific range

The invention claimed is:

1. A motor-driven compressor comprising:
a compression mechanism for compressing fluid;
an electric motor for driving the compression mechanism;
a motor drive circuit for driving the electric motor;
a housing for accommodating the compression mechanism, the electric motor, and the motor drive circuit, the housing including a leg portion formed with an insertion hole and configured to be fixed to a vehicle via a fastening device inserted into the insertion hole; and
a cover configured to protect the housing from an external force caused by a collision is fixed to the outside of the housing, and
the cover is arranged via a clearance with respect to the housing, and the external force applied to the cover is absorbed by the clearance,
wherein the cover includes a protecting portion and a mounting portion connected to the protecting portion, the protecting portion is arranged via the clearance with respect to the housing and extends in an insertion direction of the fastening device, and the mounting portion extends in a direction transverse to the insertion direction of the fastening device, and the mounting portion is fixed to the housing,
wherein the mounting portion is fixed to the housing such that the housing is arranged between the mounting portion and a vehicle.

2. The motor-driven compressor according to claim 1, wherein
the housing includes a plurality of housing portions, and
the cover covers the housing portion that accommodates the motor drive circuit.

3. The motor-driven compressor according to claim 1, wherein
the fastening device is a fastening bolt having a head portion,
an object for fixation for fixing the motor-driven compressor includes a base portion to be brought into abutment with one end of the leg portion,
the mounting portion is integrated with the protecting portion and brought into abutment with another end of the leg portion,
the base portion is formed with a screw hole which allows the fastening bolt to be screwed in,
the leg portion is formed with an insertion hole which allows insertion of the fastening bolt, and the mounting portion is formed with a through hole which allows insertion of the fastening bolt.

4. The motor-driven compressor according to claim 1, wherein the fastening device is a fastening bolt having a head portion, an object for fixation for fixing the motor-driven compressor includes a base portion to be brought into abutment with the one end of the leg portion, the mounting portion is integrated with the protecting portion and fixed to the housing via a fixing bolt, the base portion is formed with a screw hole which allows the fastening bolt to be screwed in, the leg portion is formed with an insertion hole which allows insertion of the fastening bolt, and the mounting portion is formed with a screw hole which allows the fixing bolt to be screwed.

5. The motor-driven compressor according to claim 3, wherein the mounting portion is positioned between the head portion of the fastening bolt and the leg portion at a position most apart from the object for fixation.

6. The motor-driven compressor according to claim 1, wherein a shock-absorbing material is interposed in the clearance.

7. A motor-driven compressor comprising:

a compression mechanism for compressing fluid;

an electric motor for driving the compression mechanism;

a motor drive circuit for driving the electric motor; and a housing for accommodating the compression mechanism, the electric motor, and the motor drive circuit;

a cover configured to protect the housing from an external force caused by a collision is fixed to the outside of the housing, the cover is arranged via a clearance with respect to the housing, and the external force applied to the cover is absorbed by the clearance, the housing includes a plurality of housing portions, the cover covers the housing portion that accommodates the motor drive circuit, the housing portion includes a leg portion formed with an insertion hole and configured to be fixed to a vehicle via a fastening device inserted into the insertion hole, and the cover is fixed to the housing portion via the fastening device, wherein the cover includes a protecting portion and mounting portion connected to the protecting portion, the protecting portion is arranged via the clearance with respect to the housing and extends in an insertion direction of the fastening device, and the mounting portion extends in a direction transverse to the insertion direction of the fastening device, and the mounting portion is fixed to the housing, wherein the mounting portion is fixed to the housing such that the housing is arranged between the mounting portion and a vehicle.

8. The motor-driven compressor according to claim 7, wherein the cover covers the housing portion that accommodates the electric motor.

9. The motor-driven compressor according to claim 8, wherein a shock-absorbing material is interposed in the clearance.

* * * * *